(12) United States Patent
Druart et al.

(10) Patent No.: US 11,703,386 B2
(45) Date of Patent: Jul. 18, 2023

(54) INSTRUMENT WITH MULTIPLE OPTICAL PATHS

(71) Applicant: OFFICE NATIONAL D'ETUDES ET DE RECHERCHES AÉROSPATIALES, Palaiseau (FR)

(72) Inventors: Guillaume Druart, Palaiseau (FR); Florence De La Barriere, Clichy sous Bois (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 199 days.

(21) Appl. No.: 17/414,161

(22) PCT Filed: Dec. 13, 2019

(86) PCT No.: PCT/EP2019/085045
§ 371 (c)(1),
(2) Date: Jun. 15, 2021

(87) PCT Pub. No.: WO2020/126888
PCT Pub. Date: Jun. 25, 2020

(65) Prior Publication Data
US 2022/0082434 A1 Mar. 17, 2022

(30) Foreign Application Priority Data
Dec. 19, 2018 (FR) ...................................... 18 73292

(51) Int. Cl.
*G01J 3/02* (2006.01)
*G01J 3/28* (2006.01)
(Continued)

(52) U.S. Cl.
CPC .......... *G01J 3/0208* (2013.01); *G01J 3/0259* (2013.01); *G01J 3/0294* (2013.01); *G01J 3/2823* (2013.01);
(Continued)

(58) Field of Classification Search
CPC ...... G01J 3/0208; G01J 3/0259; G01J 3/0294; G01J 3/2823; G01J 2003/2826;
(Continued)

(56) References Cited

U.S. PATENT DOCUMENTS 6,721,101 B2 * 4/2004 Daniell ................ G02B 3/0056
348/E13.043
9,036,966 B2 * 5/2015 Bhagavatula ............ G02B 6/32
385/33
(Continued)

FOREIGN PATENT DOCUMENTS

EP 2 533 519 A1 12/2012
FR 3 053 464 1/2018
(Continued)

OTHER PUBLICATIONS

International Search Report for PCT/EP2019/085045 dated Feb. 28, 2020, 5 pages.
(Continued)

*Primary Examiner* — Abdullahi Nur
(74) *Attorney, Agent, or Firm* — Nixon & Vanderhye

(57) ABSTRACT

Disclosed is an instrument including a multipath, monolithic optical component, made up of a portion of a transparent material between two opposite faces of the component. One of the two faces of the component is formed by a first refracting surface, and the other face includes several second refracting surfaces which are juxtaposed. Each optical path of the component is formed by one of the second refracting surfaces in combination with a corresponding portion of the
(Continued)

first refracting surface. One such component is suited for being part, within the instrument, of a detection module with multiple optical paths arranged in parallel, with a matrix photodetector shared by the optical paths. Such a detection module may be compact enough in order to be integrated into a cryostat cold screen, improving cooling thereof, and may be combined with an objective in order to form an instrument with multiple optical paths.

20 Claims, 5 Drawing Sheets

(51) Int. Cl.
  *G02B 3/00* (2006.01)
  *G02B 19/00* (2006.01)
(52) U.S. Cl.
  CPC ....... *G02B 3/0056* (2013.01); *G02B 19/0014* (2013.01); *G02B 19/0076* (2013.01); *G01J 2003/2826* (2013.01)
(58) Field of Classification Search
  CPC .... G01J 3/0256; G01J 3/0227; G02B 3/0056; G02B 19/0014; G02B 19/0076; G02B 3/0068
  See application file for complete search history.

(56) References Cited

U.S. PATENT DOCUMENTS

| | | |
|---|---|---|
| 2008/0204744 A1 | 8/2008 | Mir et al. |
| 2009/0321645 A1 | 12/2009 | Hinnrichs |
| 2015/0069239 A1 | 3/2015 | Kester et al. |
| 2015/0241709 A1* | 8/2015 | Stelzer ................. G02B 3/0037 359/636 |

FOREIGN PATENT DOCUMENTS

| | | |
|---|---|---|
| WO | 01/79916 | 10/2001 |
| WO | 2007/115281 A1 | 10/2007 |
| WO | 2015/015493 | 2/2015 |
| WO | 2016/092236 | 6/2016 |
| WO | 2018/002558 | 1/2018 |

OTHER PUBLICATIONS

Written Opinion of the ISA for PCT/EP2019/085045 dated Feb. 28, 2020, 9 pages.
De La Barrière et al., "Design strategies to simplify and miniaturize imaging systems" Applied Optics, vol. 50, No. 6, Feb. 20, 2011, pp. 943-951.

* cited by examiner

INSTRUMENT WITH MULTIPLE OPTICAL PATHS

CROSS-REFERENCE TO RELATED APPLICATIONS

This application is the U.S. national phase of International Application No. PCT/EP2019/085045 filed Dec. 13, 2019 which designated the U.S. and claims priority to FR 18 73292 filed Dec. 19, 2018, the entire contents of each of which are hereby incorporated by reference.

BACKGROUND OF THE INVENTION

Field of the Invention

The present invention relates to an instrument with multiple optical paths, which incorporates a multipath, monolithic component that allows dividing an incident light beam into multiple emerging beams which are deflected in various directions.

Description of the Related Art

Many imaging and spectrometric analysis applications require having multiple optical paths in parallel between a single optical entrance pupil and a single image sensor. Such configuration may be motivated by constraints on size of the optical system used, ease-of-use, assembling savings during production thereof and/or unit price. Indeed, the optical system can then be single-block, compact and easy to direct towards the scene to be imaged and/or spectrally analyzed.

Such a configuration requires reproducing a single image portion with transverse offsets on the surface of a single image sensor. Now, it is known that such image offsets can be produced in several ways, in particular by arranging mirrors as described in document WO 2016/092236. But the arrangement of such beam divider based on mirrors requires increasing the dimensions the optical system. Another approach consists in using prism-based beam dividers in a pupil of the optical system. This then requires placing the beam divider at a location where the beams arrive in planar waves, i.e. either near an entrance pupil of the system or at the exit of an afocal system. Under these conditions, the component which produces the beam dividing function must be specially designed for each optical system, because the diameter of the entrance pupil depends on the focal length of this optical system, or else the optical system is bulky because of the addition of an afocal system. In the case where a spherical-wave beam passes through such a beam divider component, images which are produced on a photodetector cannot be focused, because the surface which contains each of these images forms an angle with the surface of the photodetector, and this angle is different from one image to another. In particular, prisms which are illuminated by spherical waves—and therefore not planar waves—produce field curvature aberrations. This causes a degradation of the sharpness of each image over a significant portion thereof. Finally, another solution would be using lenses in the path of a spherical-wave beam, which are laterally offset from each other. In this way, the optical power of each lens can allow bringing the plane of best focus closer, and orienting beams which have passed through different lenses towards separate areas in the surface of the photodetector. But in order to get transverse image offsets which are sufficient, the use of lenses with non-zero optical power requires significantly changing the focal length of an objective of the optical system for maintaining an identical overall focal length of the optical system. This additionally requires increasing the length of the part of the optical system which produces the spherical-wave beam, i.e. the objective. This causes a greater bulk and requires optical systems with larger diameter. The optical system then no longer meets the compactness requirements of many applications.

In these circumstances, an object of the present invention consists in proposing a new beam divider which does not have the aforementioned disadvantages, or for which these disadvantages are reduced. More specifically, the invention aims to provide a better trade-off between focal length values which are too long and field curvatures which are two important at the surface of a photodetector shared by all the optical paths.

Another object of the invention is to propose an instrument with multiple optical paths and a single image sensor shared by all paths thereof, which is compact, and easy to handle and to calibrate.

SUMMARY OF THE INVENTION

To reach at least one of these objects or others, an aspect of the invention proposes an instrument with multiple optical paths, having a field of view which is shared by these optical paths, wherein the optical paths are arranged in parallel, each between an optical entrance of the instrument which is shared by the optical paths, and a matrix photodetector which is also shared by the optical paths, with a portion of this matrix photodetector which is dedicated to each optical path separately from any other optical path. In that way, several images of the scene are formed simultaneously by the instrument on the matrix photodetector: one image separately for each optical path. The invention instrument comprises a multipath, monolithic optical component which is made up of a portion of a material which is transparent to the use radiation, where this portion is contained between two faces of the component which are each turned towards a side opposite the other face, so that the radiation incident on one of the two faces passes through the portion between these two sides and exits through the other face. Put another way, the invention component has a transmissive plate configuration. A first of the two faces of the component is formed by a first refracting surface which has an optical axis. The other face of the component, referred to as second face, for its part comprises several second refracting surfaces which are juxtaposed without overlap in this second face. Each second refracting surface then has another optical axis separately from each other second refracting surface, where the optical axis of at least one of these second refracting surfaces is offset relative to the optical axis of the first refracting surface. Additionally, the second refracting surfaces are distributed in the second face of the component so that a light ray which passes through the first refracting surface exits from the component through at most one of the second refracting surfaces, where each second refracting surface thus forms with a respective portion of the first refracting surface an optical path for transmission which is separated from each other second refracting surface. The multipath, monolithic optical component is arranged so that each optical transmission path of this component is dedicated to one of the optical paths of the instrument.

The instrument further comprises an objective and a multipath detection module, where the objective comprises at least one lens which is shared by all the optical paths of the detection module, the detection module comprising the optical component and the matrix photodetector, and is coupled to the objective so that the optical component is located in an exit pupil of the objective, and so that a scene which is contained in the field of view of the instrument is imaged through the objective of the optical component, for each optical path, onto the matrix photodetector.

In an instrument which conforms to the invention, the side of the first refracting surface of the monolithic optical component may be the side for arrival of a radiation beam, and the side of the second refracting surfaces of this component may be the exit side of the respective radiation beams for all the optical paths. However, in other instruments which also conform to the invention, the side of the second refracting surfaces may conversely be the arrival side of a beam of the radiation, and the side of the first refracting surfaces then the exit side of the radiation beams of all optical paths.

According to a first feature of the invention, respective curvature values of the first refracting surface and each second refracting surface of the monolithic optical component are non-zero at at least one respective point of each of the first and second refracting surfaces, so that each of the first and second refracting surfaces individually modifies a convergence of a radiation beam which passes therethrough at the point corresponding to the non-zero curvature.

Also, according to a second feature of the invention, each optical path of the monolithic optical component for which the second refracting surface optical axis is offset relative to the optical axis of the first refracting surface produces a non-zero prismatic deflecting power which is effective for the radiation beam transmitted by this optical path between both sides of the component. Also, at least one among the value and the orientation of the prismatic deflecting power is different between at least two of the optical paths of the component.

In that way, the multipath, monolithic optical component which is used in the invention instrument, designated subsequently by "optical component" for brevity, can be used as a beam divider. In particular, the beam which is incident on the first or second face of this optical component, and which is common to all the optical paths, may have spherical waves, i.e. a radiation beam whose wavefronts are sphere portions.

If one of the second refracting surfaces of the optical component has a curvature which is identical to that of the first refracting surface in one of the optical paths, the component has an optical power which is zero for this optical path, but it can nevertheless have a prismatic deflecting power which is not zero for this same optical path.

Preferably, respective curvature values of the first refracting surface and each second refracting surface of the optical component may be such that this component has, separately for each optical path, a non-zero optical power which is effective for the radiation beam transmitted by this optical path between both sides of the component.

In a way known to the person skilled in the art, the optical power of an optical component has a modifying effect on the convergence—or divergence—of a radiation beam, which is effective between an entrance and an exit of the component. The optical power results from an effect of light refraction associated with curvature values of the refractive surfaces through which each light ray passes.

The principle of optical power is different from that of prismatic deflecting power of an optical component. The prismatic deflecting power is an effect of modifying the inclination of the radiation beam, also effective between the entrance and exit of the component. The prismatic deflecting power also results from the effect of light refraction, but when it is combined with midplanes of the refractive surfaces which are not parallel to each other.

In the optical component of the invention instrument, for at least one of the optical paths which is transversely offset relative to the optical axis of the first refracting surface, the midplane of the second refracting surface of that optical path may form a non-zero angle with a midplane which is determined for the first refracting surface in a portion thereof effective for the same optical path. The prismatic deflecting power then results from this angular difference between the midplanes, and a non-zero optical power value of the component in the relevant optical path results from curvature difference between the first and second refracting surfaces inside this path.

The optical component can thus combine, for each of the optical paths thereof which is offset relative to the optical axis of the first refracting surface, a non-zero optical power and the non-zero prismatic deflecting power. With this combination, a trade-off can be reached for each optical path between a focal length value which is not too long for an imaging system incorporating the component, and a field curvature which is not too important in an image plane which is shared by all the optical paths. Because of this last feature, the optical component can be combined, in the multipath detection module of the instrument, with the matrix photodetector which is shared by all the optical paths. The detection module can then be compact while also having several optical paths.

Furthermore, such detection module can be combined with various objectives, forming for example a range of objectives with different focal length values. To this purpose, the detection module may be assembled with each of the objectives interchangeably, each time so that the optical component from the invention is located in an exit pupil of the objective.

Generally for the invention, at least one of the first refractive surface and each second refractive surface of the optical component may be a Fresnel surface. Alternatively, this may be a surface devoid of jumps and angle lines, i.e. a surface that is continuous and has continuous derivatives. Further, the first refracting surface and/or at least one of the second refracting surfaces of the optical component may be aspherical. With such aspherical shapes, optical aberrations and/or off-centering aberrations, which are caused by the inclination of the radiation beam exiting from each optical path for which the second refracting surface optical axis is transversely offset relative to that of the first refracting surface, can in particular be reduced.

Generally, at least one among the first refracting surface and the second refracting surfaces of the optical component may be of free-surface type, i.e. without any axis of symmetry of revolution and without any center of symmetry. Such surface is called free surface, and is known under the name Freeform®.

Alternately, each first and/or second refractive surface of the optical component may be circularly symmetric, in particular be a sphere portion, or be a portion of a conical surface.

Preferably, the first refracting surface and each second refracting surface of the optical component may have respective centers of curvature which are located on a same side of the component. For example, when the respective centers of curvature are on the side of the first refracting surface of the component, this first refracting surface has a divergent lens effect for a radiation beam which is incident on this first refracting surface, and each second refracting surface has a convergent lens effect. Further, the respective curvature values of the first refracting surface and of each second refracting surface can be selected so that the component produces a convergent lens effect in each of the optical paths thereof.

Since the optical component is monolithic, assembly thereof within the multipath optical instrument can be quick and simple. In particular, focusing which is identical for the optical paths involved can be achieved by a specific adjustment of the shape of one or more of the second refracting surfaces. The unit price of the optical instrument can be reduced that way.

Furthermore, the optical component can have reduced dimensions, in particular a small thickness, so that it can have a heat-generating capacity that is low. It can thus be easily cooled, in particular for use in a detection instrument which is sensitive in the thermal infrared range.

Finally, the optical component which is used in the invention instrument may be made by a diamond machining method, by molding or by photolithography, based on the material thereof and the shapes of the refracting surfaces thereof.

In various embodiments of the invention, at least one of the following additional features may be used, alone or in combination of several of them:
- the optical axis of each second refracting surface of the optical component may be parallel to the optical axis of the first refracting surface thereof;
- two of the optical paths of the optical component for which the respective optical axes of the second refracting surfaces are symmetrically offset relative to the optical axis of the first refracting surface, may have optical powers which are equal and have prismatic deflecting powers which are equal in absolute value but oriented symmetrically relative to the optical axis of the first refracting surface;
- the second refracting surfaces of the optical component may be juxtaposed in the second face of the component in order to form a 2×2, 2×3, 3×3, 3×4 or 4×4 matrix;
- the material forming the optical component may be organic, in particular based on polycarbonate, polymethyl-methacrylate, cyclo-olefin copolymer, polyethylenimine, polyether-sulfone, polyamide-12, or be based on melted silica, when the radiation used comprises spectral components whose wavelengths are comprised between 0.36 µm (micrometer) and 2 µm;
- the material forming the optical component may be an alkali halide, also known as "alkalide," such as potassium bromide, when the radiation used comprises spectral components whose wavelengths are comprised between 0.36 µm and 14 µm;
- the material forming the optical component may be based on non-ferrous materials such as germanium, silicon, zinc sulfide, zinc selenide, gallium arsenide, or be a chalcogenide-based glass, or even be polyethylene based, when the radiation used includes spectral components whose wavelengths are comprised between 0.36 µm and 14 µm;
- the radius of curvature of the first refracting surface of the optical component may be comprised between 30 mm (millimeter) and 600 mm in absolute value, and the radius of curvature of each second refracting surface of the component may be included between 5 mm and 300 mm in absolute value;
- the prismatic deflecting power of each optical path of the optical component, for which the optical axis of the second refracting surface is offset relative to the optical axis of the first refracting surface, may be included between 1° and 40° in absolute value;
- each second refracting surface of the optical component may have an area which is comprised between 7 mm$^2$ and 900 mm$^2$; and
- the optical component may further comprise at least one spectral filter which is arranged for filtering the light rays which are transmitted by one of the optical paths. Advantageously, this spectral filter may be placed on the second refracting surface of the optical path of concern. Preferably, at least two of the second refracting surfaces may carry respective spectral filters, one filter per second refracting surface, where these filters have spectral filtering features which are different between two of these second refracting surfaces.

The instrument from the invention may in particular form a multispectral image capture unit, or a part of a spectrometer, or a part of a three-dimensional imaging system.

Advantageously, the objective and the detection module may be coupled to each other removably, so that the objective can be replaced by another, in particular to change the overall focal length of the instrument.

When the instrument forms several images of a single object which is located in the field of view of the instrument onto the matrix photodetector, radiation originating from one point of this object may have a wavefront which is curved near that of the first and second face of the optical component which is turned towards the objective.

The instrument may further comprise an angular field limiter arranged for filtering light rays which pass through the optical component according to the inclination thereof relative to the optical axis of the first refracting surface, so that the inclinations of the light rays which are incident on the optical component are selectively less than an inclination threshold set by the angular field limiter. Alternatively or in combination, the instrument may comprise at least one set of separating walls which are arranged between the optical component and the matrix photodetector in order to isolate radiation transmitted by different optical paths.

Advantageously also for some applications, a mask with openings may additionally be used in the instrument, where this mask has one opening per optical path in order to limit the transverse section of this optical path, and/or to mask zones of the optical component which are not useful for the imaging function of the instrument, and/or to eliminate parasitic images formed by radiation not having passed through the useful zones of the optical component, and/or to set the respective pupils of the optical paths of the instrument. Useful zones of the optical component is understood to mean the second refracting surfaces, excluding separation zones which may exist in the second face of the optical component between second refracting surfaces which are neighboring in this second face. These separation zones are therefore unusable zones for the imaging function of the instrument, and likewise a peripheral zone may exist in the second face of the optical component, around the set of second refracting surfaces. When the optical component is located in the exit pupil of the objective, each opening of this mask has the opening diaphragm function for the optical path of concern.

For some applications of the invention instrument, each of the optical paths thereof may comprise at least one filter in addition to the corresponding portion of the matrix photodetector and to the corresponding path of the optical component. This filter may determine a spectral transmission band of the concerned optical path of the instrument, which is different from the spectral transmission band of at least one of the other optical paths of the instrument. Then, in this case, two of the second refracting surfaces, which are associated with different filters in their respective optical paths, may have curvatures which are different in order to compensate for an longitudinal chromatism effective between two wavelengths of radiation which are each transmitted separately by one of the two filters.

Again depending on the application, the invention instrument may further comprise a combination of a cryostat and a cooling machine. Inside the cryostat, the matrix photodetector is arranged on a support commonly called cold table or cold finger, which is thermally coupled to the cooling machine. Further, the monolithic, multipath optical component may be surrounded laterally by a screen, called cold screen, which is also in thermal contact with the support of the matrix photodetector. This cold screen can serve as mounting support for the component, and/or each filter used, and/or the mask, and/or the separating walls. It may also form the angular field limiter.

BRIEF DESCRIPTION OF THE DRAWINGS

Other particulars and advantages of the present invention will appear in the following description of a non-limiting embodiment example provided with reference to the attached drawings in which.

DETAILED DESCRIPTION OF INVENTION EMBODIMENTS

For clarity sake, dimensions of elements which are represented in these figures do not correspond either to actual dimensions or actual ratios of dimensions. Further, identical references which are indicated in different figures denote elements which are identical or which have identical functions.

Figure 1A:
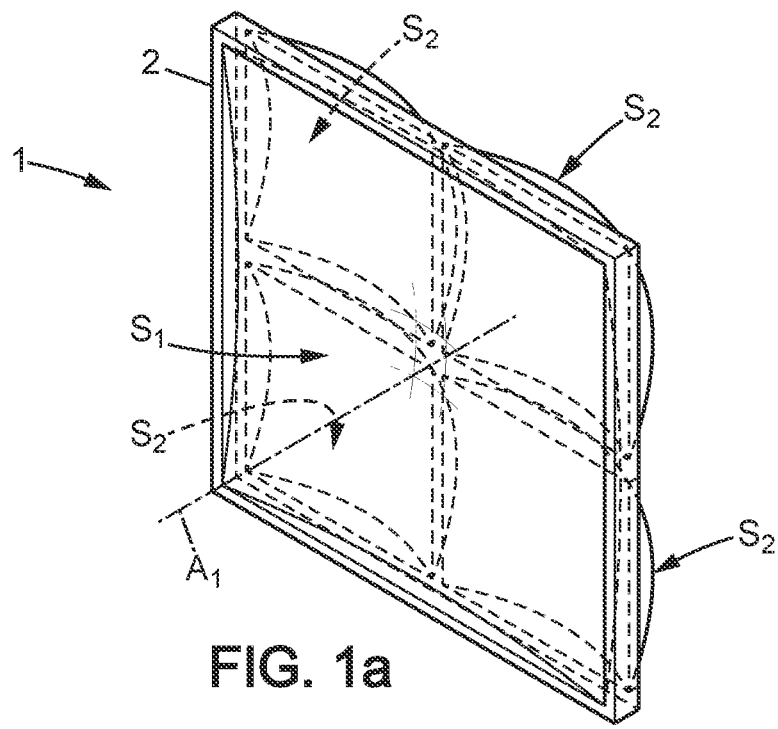
FIG. 1a and FIG. 1b are two perspective views of an optical component which may be used in an instrument according to the invention, from two opposite sides of the component.
Figure 1B:
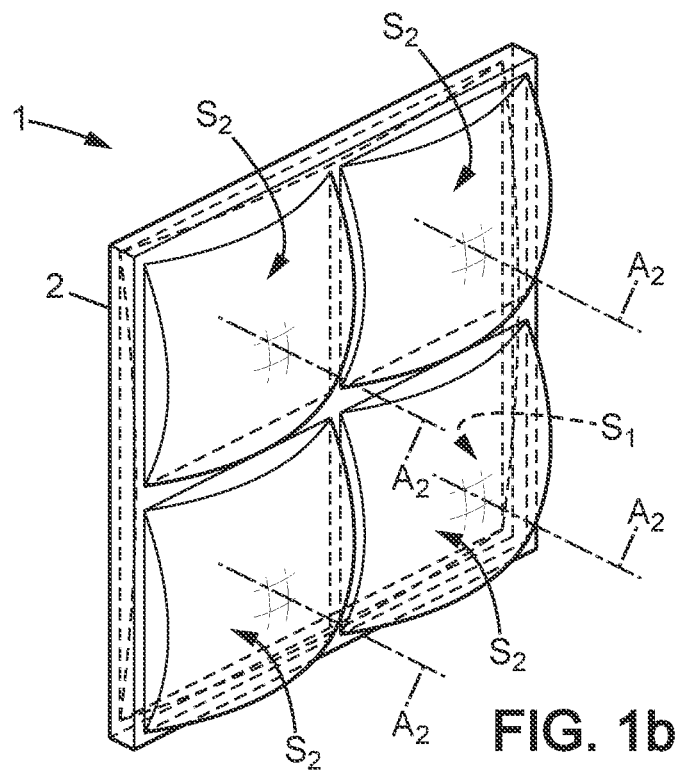

With reference to FIG. 1a and FIG. 1b, an optical component 1 which is used for the invention may be made of germanium, in order to be transparent for electromagnetic radiation with a wavelength comprised between 2 μm and 14 μm. The component 1 has two opposite faces, which may be connected by a peripheral rib 2. For illustration, the component 1 from FIG. 1a and FIG. 1b has a square periphery. The first face of the component 1, which is directly visible on FIG. 1a, is formed by a refracting surface $S_1$, which may for example be spherical or aspherical. $A_1$ denotes the optical axis of the refracting surface $S_1$. The second face of the component 1, which is directly visible on FIG. 1b, may be formed by four refracting surfaces $S_2$ which are juxtaposed in a 2×2 matrix and which may each be spherical or aspherical, again as an example. $A_2$ denotes the respective optical axis of each refracting surface $S_2$. Each optical axis $A_2$ may be parallel to the optical axis $A_1$, and offset laterally relative thereto. When each of the surfaces $S_1$ and $S_2$ is also a sphere portion, with a sphere center located on the corresponding optical axis $A_1$ or $A_2$, then each refracting surface $S_2$ has a midplane which is not parallel to the midplane of the portion of the refracting surface $S_1$ through which passes the same radiation beam as passes through this surface $S_2$. For this reason, each refracting surface $S_2$ and the corresponding portion of the refracting surface $S_1$ together produce a prismatic deflecting power for the radiation beam which passes through them. Such a prismatic deflecting power therefore results from average inclinations of the two refracting surfaces which are different. For the component 1 shown, the refracting surface $S_1$ is concave and substantially spherical, and each refracting surface $S_2$ is convex and substantially spherical. Then the prismatic deflection of each optical path formed by one of the refracting surfaces $S_2$ with the corresponding portion of the refracting surface $S_1$ has the effect of separating the average direction of propagation of a plane-wave beam which is incident parallel to the optical axis $A_2$ of the refracting surface $S_2$ from this optical axis.

If the refracting surface $S_1$ and one of the refracting surfaces $S_2$ have identical curvatures, for the component 1 of FIG. 1a and FIG. 1b, then a convergence or divergence of the radiation beam is unchanged when it passes through these two surfaces. Conversely, if the refracting surface $S_1$ and the refracting surface $S_2$ have different curvatures, the convergence or divergence of the radiation beam is changed when it passes through the two surfaces. In other words, the optical path which is formed by these two refracting surfaces has a non-zero optical power value. In particular, the optical power of each optical path of the component 1 is positive, corresponding to a converging lens effect, when the radius of curvature of the corresponding refracting surface $S_2$ is smaller than the radius of curvature of the refracting surface $S_1$, with these radii of curvature being considered in absolute value.

Figure 2:
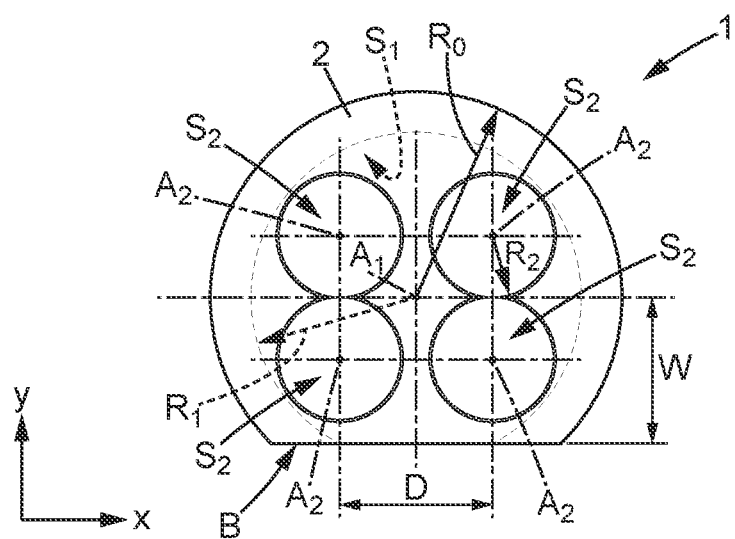
FIG. 2 is a plan view of another optical component which can be used in an instrument according to the invention.

The implementation variant of the component 1 which is shown in FIG. 2 has a rib 2 which is circular apart from a straight-line edge segment B. The refracting surfaces $S_1$ and $S_2$ each have a peripheral limit which is circular. Further, the refracting surfaces $S_2$ have different positions along the x and y directions relative to the refracting surface $S_1$: two refracting surfaces $S_2$ which are adjacent along the y direction are tangent, and two refracting surfaces $S_2$ which are adjacent along the x direction are separated, and all of the refracting surfaces $S_2$ are symmetrically distributed relative to the optical axis $A_1$.

As an example, the following dimensions may be used:
outer radius $R_0$ of the rib 2 parallel to the x-y plane: about 8.4 mm;
radius $R_1$ of the peripheral limit of the refracting surface $S_1$ parallel to the x-y plane: about 6.75 mm;
radius $R_2$ of the peripheral limit of each refracting surface $S_2$ parallel to the x-y plane: about 2.5 mm;
distance D between the optical axes $A_2$ of two refracting surfaces $S_2$ which are adjacent along the x direction: about 6.25 mm;
distance between the optical axes $A_2$ of two refracting surfaces $S_2$ which are adjacent along the y direction: about 5.0 mm;
radius of curvature of the refracting surface $S_1$, assumed approximately spherical and concave: about 160 mm;
radius of curvature of each refracting surface $S_2$, assumed approximately spherical and convex: about 83 mm;
thickness of component 1, measured parallel to the optical axis $A_1$ between the periphery of the refracting surface $S_1$ and the center of each refracting surface $S_2$: about 0.50 mm; and distance W between the straight edge segment B and the optical axis $A_1$:
about 5.95 mm.

Starting from these dimensions, the person skilled in the art knows how to determine the values of the prismatic deflecting power and the optical power of each optical path of component 1 either by an approximate calculation or by a ray-tracing method. These values are non-zero for the specific dimensions indicated above.

Figure 3A:
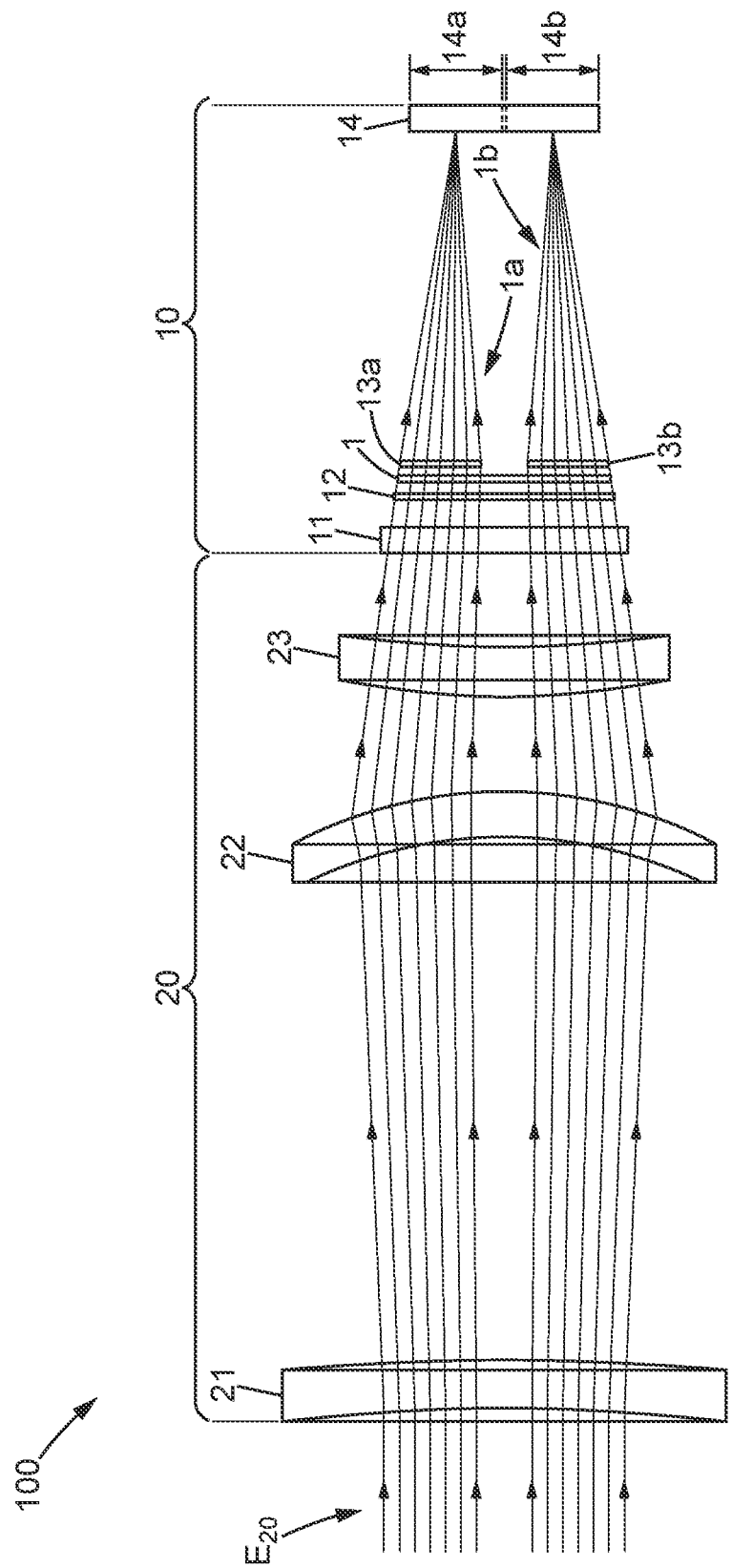
FIG. 3a and FIG. 3b are cross-section views of two instruments which conform to the invention and which each incorporates an optical component conforming to FIG. 2.

In accordance with FIG. 3*a*, an optical instrument 100 comprises a detection module 10 and an objective 20 which are assembled with each other in a way which is not shown, for example by means of mounting rings or any other connecting device.

Figure 3B:
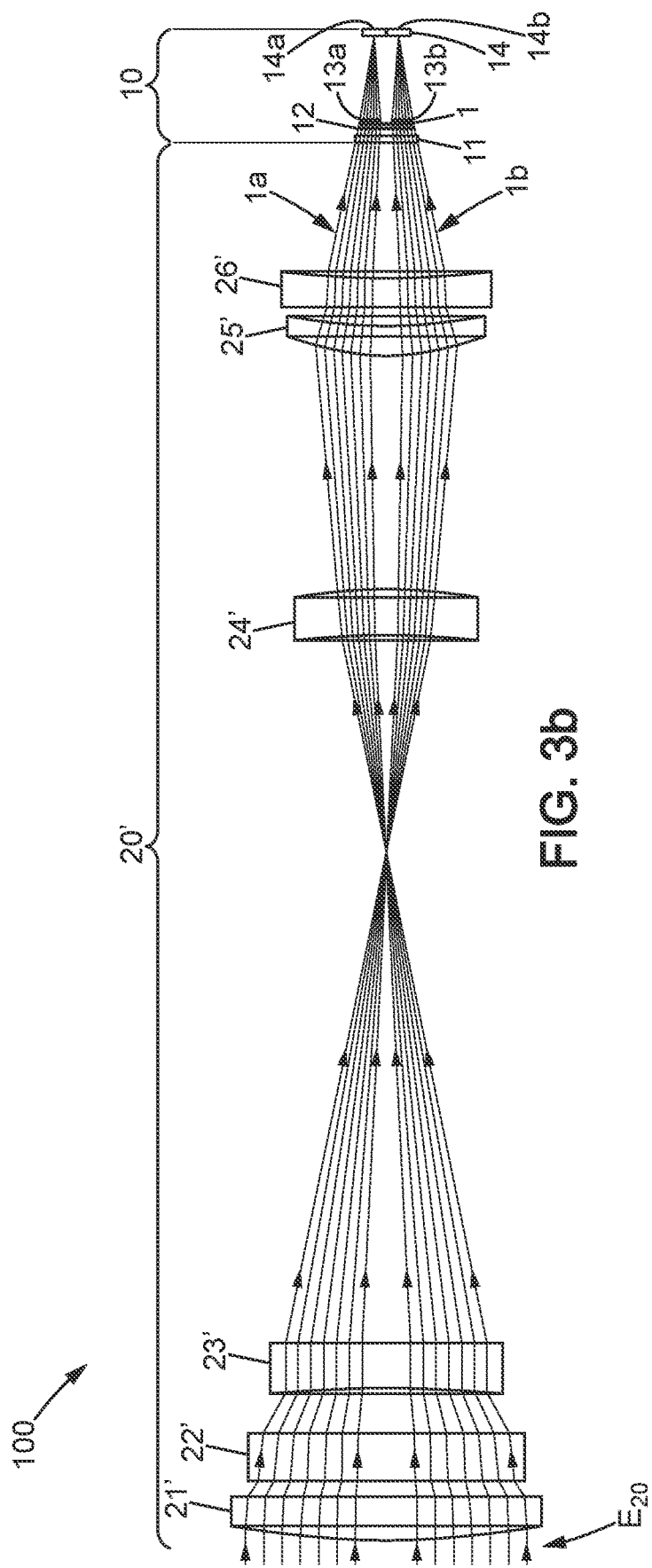

The objective 20 may be a retrofocus wide field-of-view model with a focal length of 39.5 mm as shown in FIG. 3*a*. However, the objective 20 may be interchangeable for other models, like for example, a narrow field-of-view re-imager type objective 20' with a focal length of 158 mm, as shown in FIG. 3*b*. The person skilled in the art is capable of determining the numeral data for lenses 21, 22 and 23 of the objective 20 shown in FIG. 3*a*, or the lenses 21'-26' of the objective 20' shown in FIG. 3*b*, and similarly for the lenses of any other objective model which is intended to be used alternatively with the detection module 10. $E_{20}$ designates the optical entrance of the objective 20 or 20'.

The detection module 10 which is shown in FIG. 3*a* and FIG. 3*b* comprises, in the order along the direction of propagation of the radiation which is transmitted by the objective 20 or 20': a window 11, a wideband spectral filter 12, the optical component 1 of FIG. 2, narrowband spectral filters 13*a*, 13*b*, etc. and a matrix photodetector 14. The detection module 10 and each objective 20 or 20' are designed so that, when they are assembled together so that the instrument 100 is operational, the optical component 1 is located in the exit pupil of the objective 20 or 20'. Additionally, the lenses 21-23 of the objective 20, or those 21'-26' of the objective 20', have respective optical axes which coincide with the optical axis $A_1$ of the refracting surface $S_1$ of the optical component 1, and that axis passes preferably by a geometric center of the photosensitive surface of the matrix photodetector 14.

Within the detection module 10, the optical component 1 may be positioned so that the refracting surface $S_1$ thereof is turned towards the objective 20 or 20', and the refracting surfaces $S_2$ determine the optical paths of the instrument 100. The lenses 21-23 of the objective 20 or those 21'-26' of the objective 20', the window 11, the wideband spectral filter 12 and the matrix photodetector 14 are common to the four optical paths. The photosensitive surface of the matrix photodetector 14 is perpendicular to the optical axis $A_1$, and located about 21.5 mm behind the optical component 1, so that a portion 14*a* of the photosensitive surface of the matrix photodetector 14 is dedicated to the optical path 1*a*, and another portion 14*b* of the photosensitive surface thereof, disjoint from portion 14*a*, is dedicated to the optical path 1*b*. Two other portions, still of the photosensitive surface of the matrix photodetector 14, mutually disjoint, and disjoint from portions 14*a* and 14*b*, are dedicated to two other optical paths (not shown). The filter 13*a* is arranged selectively on the optical path 1*a*, the filter 13*b* on the optical path 1*b*, and two other narrowband spectral filters (not shown) for the two other optical paths, one per optical path. The narrowband spectral filters 13*a*, 13*b*, etc. may advantageously be assembled in a 2×2 matrix within a single rigid component that is easy to mount in the detection module 10. In particular, the filters 13*a*, 13*b*, etc. may be either held individually in a shared mounting, or be butt-joined using adhesive to form an overall plate, or made by photolithography and thin layer deposition on a plate serving as common substrate for these filters. For example, each spectral filter 13*a*, 13*b*, etc. may have a thickness of about 0.5 mm. But in alternative embodiments, which may be better suited depending on the application of the instrument 100, each spectral filter 13*a*, 13*b*, etc. may be secured to the component 1 by being carried by one of the refractive surfaces $S_2$ thereof.

In this way, the four optical paths 1*a*, 1*b*, etc. simultaneously form respective images of a single content in the field of view of the instrument 100 on the corresponding portions 14*a*, 14*b*, etc. of the photosensitive surface of the matrix photodetector 14. These images which together form a multispectral image with four spectral components, one per optical path, are simultaneously captured during a single operating sequence of the matrix photodetector 14. Because of the use of the optical component 1, the four images are simultaneously sharp. With the numeral values which were cited with reference to FIG. 2, the instrument 100 has an overall focal length of 25 mm when the retrofocus type wide field-of-view objective 20 with a 39.5 mm focal length is used, and an overall focal length of 100 mm when the re-imager type narrow field-of-view objective 20' with a focal length of 158 mm is used. The distance between the front face of the window 11 and the photosensitive surface of the matrix photodetector 14 is about 26.37 mm. The shape of the refracting surfaces $S_2$ of the optical component 1 could be adjusted differently between different optical paths, according to the narrow spectral band of the filter 13*a*, 13*b*, etc. of this optical path. In particular, this additional adjustment can compensate for variations in the values of the indices of refraction of the materials of lenses 21-23 or 21'-26' and of the component 1 with the wavelength of the radiation. FIG. 3*a* and FIG. 3*b* each further show a planar wave radiation beam which enters into the instrument 100 by the optical entrance $E_{20}$ and which is simultaneously focused on the portions 14*a*, 14*b*, etc. of the photodetector 14.

An instrument like 100 may be designed for operating in one of the visible spectral domains, near-infrared known under the acronym NIR, or in the SWIR domain. In these cases, cooling for the detection module 10 might not need to be provided.

Figure 4:
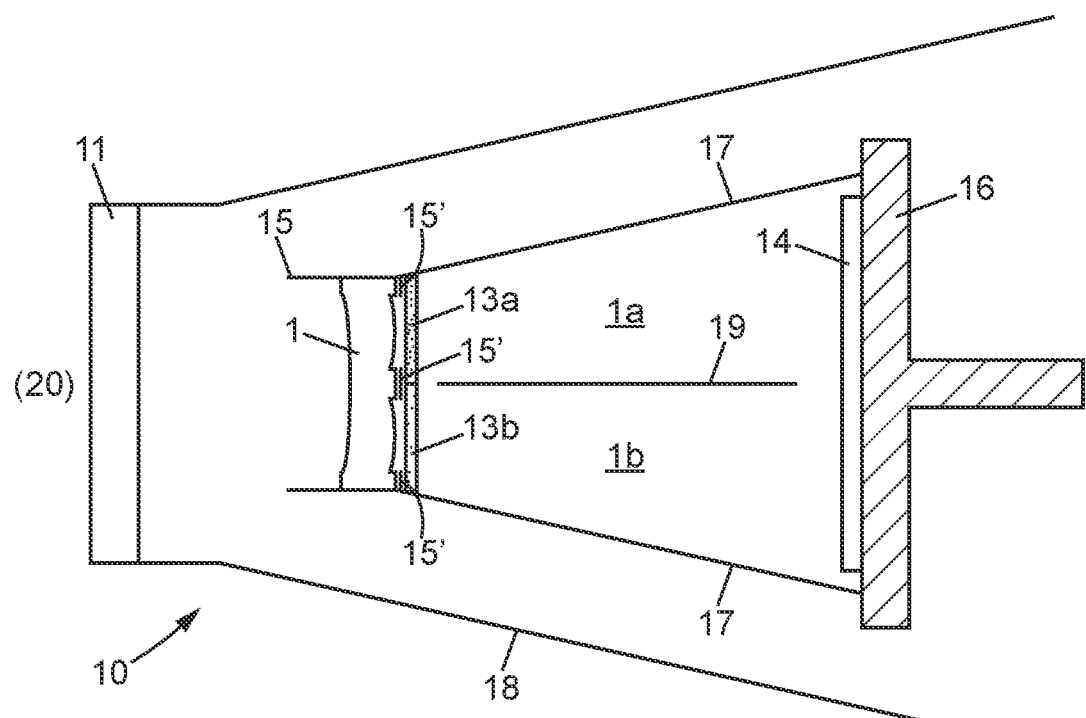
FIG. 4 is a detailed section view of a part of the instruments of FIG. 3a and FIG. 3b.

Alternatively, the instrument 100 may be designed for operating in one of the spectral domains designated by MWIR or LWIR. In these other cases, it may be necessary to provide a cooling system for the detection module 10. FIG. 4 shows a possible configuration for such a detection module 10 intended to be cooled. The matrix photodetector 14 is fixed, for example by adhesive, onto a support 16, commonly called cold table or cold finger in the jargon of the person skilled in the art, so as to produce a good thermal contact between the photodetector 14 and the support 16. The support 16 is out of a thermally conducting material and is coupled to a cooling machine (not shown). A lateral wall 17 surrounds the optical part of the detection module 10, i.e. the component 1, the spectral filters, in particular the filters 13*a*, 13*b*, etc. which are individually dedicated to each optical path 1*a*, 1*b*, etc., and other optional components of the module 10 such as diaphragms, masks, separating walls between the optical paths, etc. The posterior end of the lateral wall 17 is in thermal contact with the cold table 16 in order to be cooled at the same time as this latter. For this reason, the lateral wall 17 is commonly called cold screen. Further, the assembly which was just described, intended to be cooled, can be contained in an empty enclosure, which constitutes a cryostat. The lateral wall 18 of the cryostat is not in thermal contact with the parts intended to be cooled which were just described, and it is tightly sealed by the window 11 on the side of the objective 20. The window 11 is made of a material which is transparent for the operating spectral domain of the instrument 100.

In order to reduce parasitic radiation and/or parasitic images which could degrade the quality of the images formed on the photodetector 14 by the optical paths 1a, 1b, etc., the detection module 10 may further comprise at least one of the following supplemental elements:

- an angular field limiter 15 which may be placed right upstream of the optical component 1 along the direction of propagation of the radiation in the instrument 100. Such an angular field limiter may have the shape of a tube segment or conic trunk which is coaxial with the optical axis $A_1$. It could be formed by an extension of the cold screen 17 upstream from the optical component 1;
- a mask with openings 15', for example between the optical component 1 and the narrowband spectral filters 13a, 13b, etc., for occulting parts of the optical component 1 which are intermediate between two adjacent refracting surfaces $S_2$, and also possibly an exposed part of the rib 2. The mask 15' may have a different opening for each optical path 1a, 1b, etc., which is separated from the opening dedicated to each other optical path. Given that the optical component 1 is located in an exit pupil of the objective 20 or 20', and when the mask with openings 15' is near the optical component 1, each of the openings thereof determines a pupil for the corresponding optical path of the instrument 100; and
- a matrix of separating walls 19, where each wall 19 is arranged longitudinally between the optical component 1 and the matrix photodetector 14, or between the narrowband spectral filters 13a, 13b, etc. on one end and the photodetector 14 on the other, with a separating wall between two optical paths 1a, 1b, etc. which are adjacent along any one of the directions of the matrix of the second refracting surfaces $S_2$ of the optical component 1.

It is understood that the invention may be reproduced by adapting secondary features thereof relative to the embodiments which were described in detail above. In particular, the number of refracting surfaces $S_2$ and all the numeral values which were given were only indicated for purpose of illustration.

Finally, other optical instruments than a multispectral image capture unit like the one which was just described with reference to FIG. 3a, FIG. 3b and FIG. 4 may reproduce the invention. In particular, such different instrument may in particular be used in a multipath spectrometer. For example, each of the optical paths of the spectrometer, such as determined by an optical component 1 conforming to the invention, may be dedicated to a respective spectral interval in order to direct the radiation from this spectral interval towards a diffraction network which is suited to that interval.

The invention may also be used for a three-dimensional imaging system. Such a system may have a structure which is similar to that of the instrument 100 from FIG. 3a or FIG. 3b, without the narrowband spectral filters 13a, 13b, etc. being necessary for the operation of the three-dimensional imaging. Further, the instrument is focused for scene elements to be imaged which are located in a limited separation-distance interval in front of the objective. All the optical paths then simultaneously collect light rays which are coming from a single scene element contained in the entrance optical field of the instrument. But the pupils which are effective for different optical paths of the instrument are transversely offset from each other. For this reason, the images from the same scene element which are formed respectively by the optical paths are each located at the interior of the portion of the photosensitive surface of the photodetector which corresponds to the relevant optical path, in an area of this portion of the photosensitive surface which depends on the distance of the scene element. By comparing the respective positions of these elements formed by all the optical paths, it is possible to get an estimate of the separation distance of the scene element relative to the instrument. The three-dimensional imaging function that an instrument conforming to the invention thus allows is a stereoscopic image acquisition type.

The invention claimed is:

1. An instrument with multiple optical paths, having a field of view which is shared by said optical paths, wherein the optical paths are arranged in parallel, each between an optical entrance of the instrument which is shared by said optical paths, and a matrix photodetector which is also shared by said optical paths, with a portion of said matrix photodetector which is dedicated to each optical path separately from any other optical path, wherein said instrument comprises a multipath, monolithic optical component which is made up of a portion of a material which is transparent to a use radiation, said portion being contained between two faces of the component which are each turned towards a side opposite the other face, so that the radiation incident on one of the two faces passes through the portion between both sides and exits through the other face, a first of the two faces of the component is formed by a first refracting surface which has an optical axis, the other face of the component, referred to as second face, comprises several second refracting surfaces which are juxtaposed without overlap in said second face, each second refracting surface having another optical axis separately from each other second refracting surface, where the optical axis of at least one of the second refracting surfaces is offset relative to the optical axis of the first refracting surface, the second refracting surfaces are distributed in the second face of the component so that a light ray which passes through the first refracting surface exits from the component through at most one of the second refracting surfaces, each second refracting surface thus forming with a respective portion of the first refracting surface an optical path for transmission which is separated from each other second refracting surface, respective curvature values of the first refracting surface hand each second refracting surface of the component are non-zero at at least one respective point of each of the first and second refracting surfaces, so that each of the first and second refracting surfaces individually modifies a convergence of a radiation beam which passes through said first or second refracting surfaces at the point corresponding to the non-zero curvature, each optical path of the optical component for which the optical axis of the second refracting surface is offset relative to the optical axis of the first refracting surface produces a non-zero prismatic deflecting power which is also effective for the radiation beam transmitted by said optical path between the two sides of the component, and at least one from the value and the orientation of the prismatic deflecting power is different between at least two of the optical paths of the component, the multipath, monolithic optical component is arranged so that each optical transmission path of said component is dedicated to one of the optical paths of the instrument, the instrument further comprising an objective and a detection module with multiple optical paths, the objective comprising at least one lens which is shared by all the optical paths of the detection module, the detection module comprising the optical component and the matrix photodetector, and being coupled to the objective so that said optical component is located in an exit pupil of the objective, and so that a scene which is contained in the field of view of the instrument is imaged through the objective of the optical component, for each optical path, onto the matrix photodetector.

2. The instrument according to claim 1, wherein respective curvature values of the first refracting surface and each second refracting surface of the monolithic optical component are such that said component has, separately for each optical path, a non-zero optical power which is effective for the radiation beam transmitted by said optical path between both sides of the component.

3. The instrument according to claim 1, wherein at least one among the first refracting surface and the second refracting surfaces of the monolithic optical component is of free-surface type.

4. The instrument according to claim 1, wherein two of the optical paths of the optical component for which the respective optical axes of the second refracting surfaces are symmetrically offset relative to the optical axis of the first refracting surface, have optical powers which are equal and have prismatic deflecting powers which are equal in absolute value but oriented symmetrically relative to said optical axis of the first refracting surface.

5. The instrument according to claim 1, wherein the second refracting surfaces of the monolithic optical component are juxtaposed in the second face of said component in order to form a 2×2, 2×3, 3×3, 3×4 or 4×4 matrix.

6. The instrument according to claim 1, further comprising at least one of the following elements:
an angular field limiter arranged for filtering light rays which pass through the monolithic optical component according to the inclination thereof relative to the optical axis of the first refracting surface of said component, so that the inclinations of the light rays which are incident on said optical component are selectively less than an inclination threshold set by the angular field limiter;
at least one set of separating walls which are arranged between the monolithic optical component and the matrix photodetector in order to isolate radiations transmitted by different optical paths; and
a mask with openings, said mask having one opening per optical path in order to limit the transverse section of said optical path, and/or to mask zones of the monolithic optical component which are not useful for an imaging function of the instrument, and/or to eliminate parasitic images formed by radiation not having passed through useful zones of the monolithic optical component, and/or to set the respective pupils of the optical paths of the instrument.

7. The instrument according to claim 1, wherein at least two of the second refracting surfaces of the monolithic optical component carry respective spectral filters, one filter per second refracting surface, these filters having spectral filtering features which are different between two of said second refracting surfaces.

8. The instrument according to claim 1, wherein each optical path of said instrument comprises at least one filter in addition to the corresponding portion of the matrix photodetector and to the corresponding path of the monolithic optical component, said filter determining a spectral transmission band of said optical path of the instrument, which is different from the spectral transmission band of at least one of the other optical paths of the instrument.

9. The instrument according to claim 8, wherein two of the second refracting surfaces, which are associated with different filters in the respective optical paths, have different curvatures in order to compensate for a longitudinal chromatism that is effective between two wavelengths of radiation which are each transmitted separately by one of said filters.

10. The instrument according to claim 1, further comprising a combination of a cryostat and a cooling machine, and wherein, inside the cryostat, the matrix photodetector is arranged on a support which is thermally coupled to the cooling machine, and wherein the multipath, monolithic optical component is surrounded laterally by a screen which is also in thermal contact with the support of the matrix photodetector.

11. A multispectral image capture unit comprising the instrument of claim 1.

12. A spectrometer comprising the instrument of claim 1.

13. A three-dimensional imaging system comprising the instrument of claim 1.

14. The instrument according to claim 2, wherein at least one among the first refracting surface and the second refracting surfaces of the monolithic optical component is of free-surface type.

15. The instrument according to claim 2, wherein two of the optical paths of the optical component for which the respective optical axes of the second refracting surfaces are symmetrically offset relative to the optical axis of the first refracting surface, have optical powers which are equal and have prismatic deflecting powers which are equal in absolute value but oriented symmetrically relative to said optical axis of the first refracting surface.

16. The instrument according to claim 3, wherein two of the optical paths of the optical component for which the respective optical axes of the second refracting surfaces are symmetrically offset relative to the optical axis of the first refracting surface, have optical powers which are equal and have prismatic deflecting powers which are equal in absolute value but oriented symmetrically relative to said optical axis of the first refracting surface.

17. The instrument according to claim 2, wherein the second refracting surfaces of the monolithic optical component are juxtaposed in the second face of said component in order to form a 2×2, 2×3, 3×3, 3×4 or 4×4 matrix.

18. The instrument according to claim 3, wherein the second refracting surfaces of the monolithic optical component are juxtaposed in the second face of said component in order to form a 2×2, 2×3, 3×3, 3×4 or 4×4 matrix.

19. The instrument according to claim 4, wherein the second refracting surfaces of the monolithic optical component are juxtaposed in the second face of said component in order to form a 2×2, 2×3, 3×3, 3×4 or 4×4 matrix.

20. The instrument according to claim 2, further comprising at least one of the following elements:
an angular field limiter arranged for filtering light rays which pass through the monolithic optical component according to the inclination thereof relative to the optical axis of the first refracting surface of said component, so that the inclinations of the light rays which are incident on said optical component are selectively less than an inclination threshold set by the angular field limiter;

at least one set of separating walls which are arranged between the monolithic optical component and the matrix photodetector in order to isolate radiations transmitted by different optical paths; and a mask with openings, said mask having one opening per optical path in order to limit the transverse section of said optical path, and/or to mask zones of the monolithic optical component which are not useful for an imaging function of the instrument, and/or to eliminate parasitic images formed by radiation not having passed through useful zones of the monolithic optical component, and/or to set the respective pupils of the optical paths of the instrument.

* * * * *